United States Patent

[11] 3,604,099

[72] Inventor Fred J. Schneider
Catasauqua, Pa.
[21] Appl. No. 850,945
[22] Filed Aug. 18, 1969
Division of Ser. No. 724,380, Apr. 26, 1968, Pat. No. 3,477,630.
[45] Patented Sept. 14, 1971
[73] Assignee Western Electric Company, Inc.
New York, N.Y.

[54] METHODS OF AND APPARATUS FOR BONDING LEADED DEVICES TO SUBSTRATES

3 Claims, 10 Drawing Figs.

[52] U.S. Cl. .......... 29/429, 29/208
[51] Int. Cl. .......... B23p 19/00, B23p 19/04
[50] Field of Search .......... 29/203 P, 203 B, 208, 407, 429, 624, 626; 228/6

[56] References Cited

UNITED STATES PATENTS

| | | | |
|---|---|---|---|
| 3,102,331 | 9/1963 | DaCosta | 29/203 |
| 3,337,941 | 8/1967 | Drop | 29/407 X |
| 3,475,805 | 11/1969 | Rottmann | 29/208 X |
| 3,489,952 | 1/1970 | Hinchey | 29/624 X |

*Primary Examiner*—Thomas E. Condon
*Assistant Examiner*—E. F. Desmond
*Attorneys*—H. J. Winegar, R. P. Miller and R. Y. Peters

ABSTRACT: Methods of and apparatus for aligning a first article, such as a beam-lead integrated circuit, supported on a pivotally mounted tray with a reference image, and then operating a bonding head to pick up the circuit at an assembled position. The tray and bonding head are moved away from the assembly position and a conveyor is indexed to move a second article, such as a substrate, on a workholder beneath the bonding head. The workholder is lifted out of a nest in the conveyor and elevated to a bonding level where the substrate is aligned with the reference image after which the head is actuated to bond the beam-lead integrated circuit to the substrate.

Figure 1:
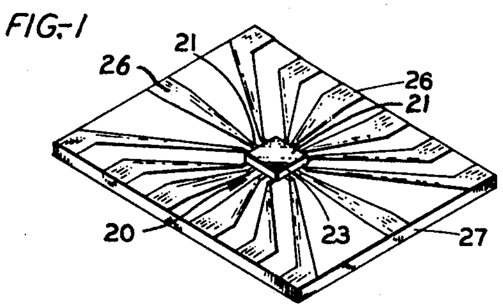

INVENTOR
F. J. SCHNEIDER
BY
ATTORNEY

METHODS OF AND APPARATUS FOR BONDING LEADED DEVICES TO SUBSTRATES

CROSS-REFERENCE TO RELATED APPLICATION

This is a division of application Ser. No. 724,380, filed Apr. 26, 1968 now U.S. Pat. No. 3,477,630.

SUMMARY OF THE INVENTION

A method of assembling each one of a mass of first articles which are arranged in a plane with each one, respectively, of a group of second articles, at a predetermined spatial position, includes cyclically rotating the mass of first articles to move a selected one of the first articles into the spatial position. Each selected first article is withdrawn from the spatial position. The remainder of the first articles are moved away from the immediate vicinity of the spatial position following each withdrawal of a selected first article. The group of second articles are arranged in a column and advanced, moving successively, one at a time, into alignment with the spatial position. Each successive second article is transferred to the spatial position in a predetermined orientation. Each selected first article is returned to the spatial position and assembled to the transferred second article, respectively.

In particular, a method of assembling an article of a mass of articles to a substrate at a predetermined spatial position includes initially arranging the mass in a horizontal plane. The mass is moved into another horizontal plane which includes the spatial position. The mass is rotated and translated to move a selected one of the articles into the spatial position in a predetermined orientation. The selected article is held and withdrawn from the spatial position, and the remainder of the mass of articles is moved to a remote location. A substrate is conveyed to a location which lies in a vertical plane through the spatial position, transferred to the horizontal plane including the spatial position, and moved to the spatial position in a predetermined orientation. The selected article is returned to the spatial position to abut against the substrate, and bonded thereto.

A suitable apparatus for aligning a first article with a second article at an assembly position includes a tray for holding a plurality of first articles. The tray is mounted for pivotal movement in and out of assembly position and for rotational movement in the assembly position. A reference reticle is used for aligning articles in the assembly position. The tray, normally maintained in the assembly position, can be pivoted away therefrom. A selected first article can be held off the tray in an aligned position. The tray is pivoted from the assembly position, and a plurality of successive, individually mounted second articles are intermittently moved to position the leading one of the second articles in registration with the reticle. The leading one of the second articles is lifted and then rotated.

The mounting means for the tray, and the lifting member for the second articles, are supported for longitudinal and transverse movement. A mechanism is operable (a) when the tray is in the assembly position for moving the tray to substantially align the selected first article with the reticle, and (b) when the leading one of the second articles is in the assembly position for aligning the leading second article with the reticle. The tray, when in the assembly position, can be rotated to align a selected one of the first articles with the reticle. The lifting member can be rotated to align the leading one of the second articles with the reticle.

INCORPORATION BY REFERENCE OF U.S. PATENT

The subject matter set forth in a U.S. Pat. No. 3,477,630 issued Nov. 11, 1969, to Fred J. Schneider entitled "Apparatus for Assembling Articles" is hereby incorporated by reference and made a part hereof.

DRAWINGS

Figure 4:
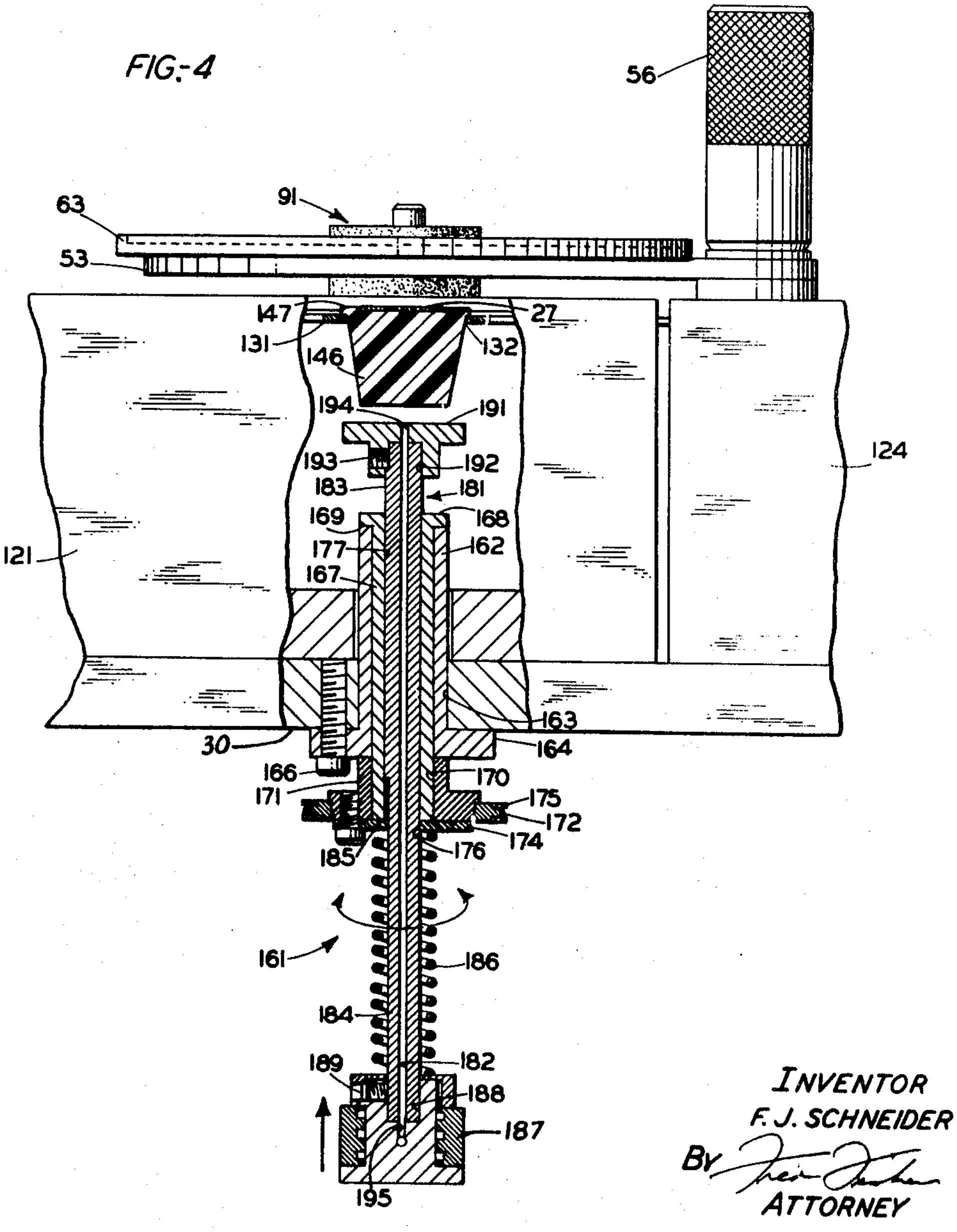
Figure 2:
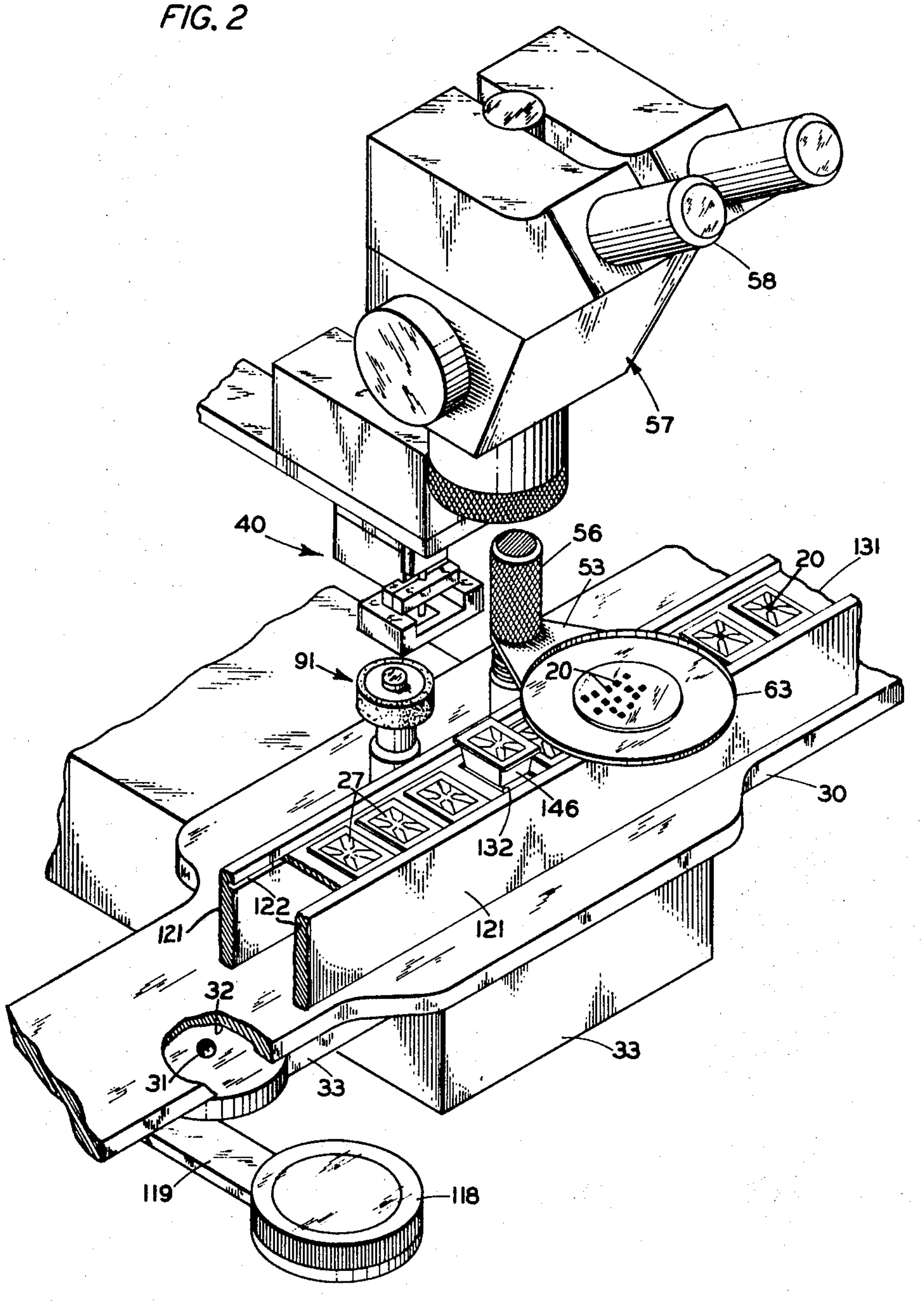
Figures 3, 9:
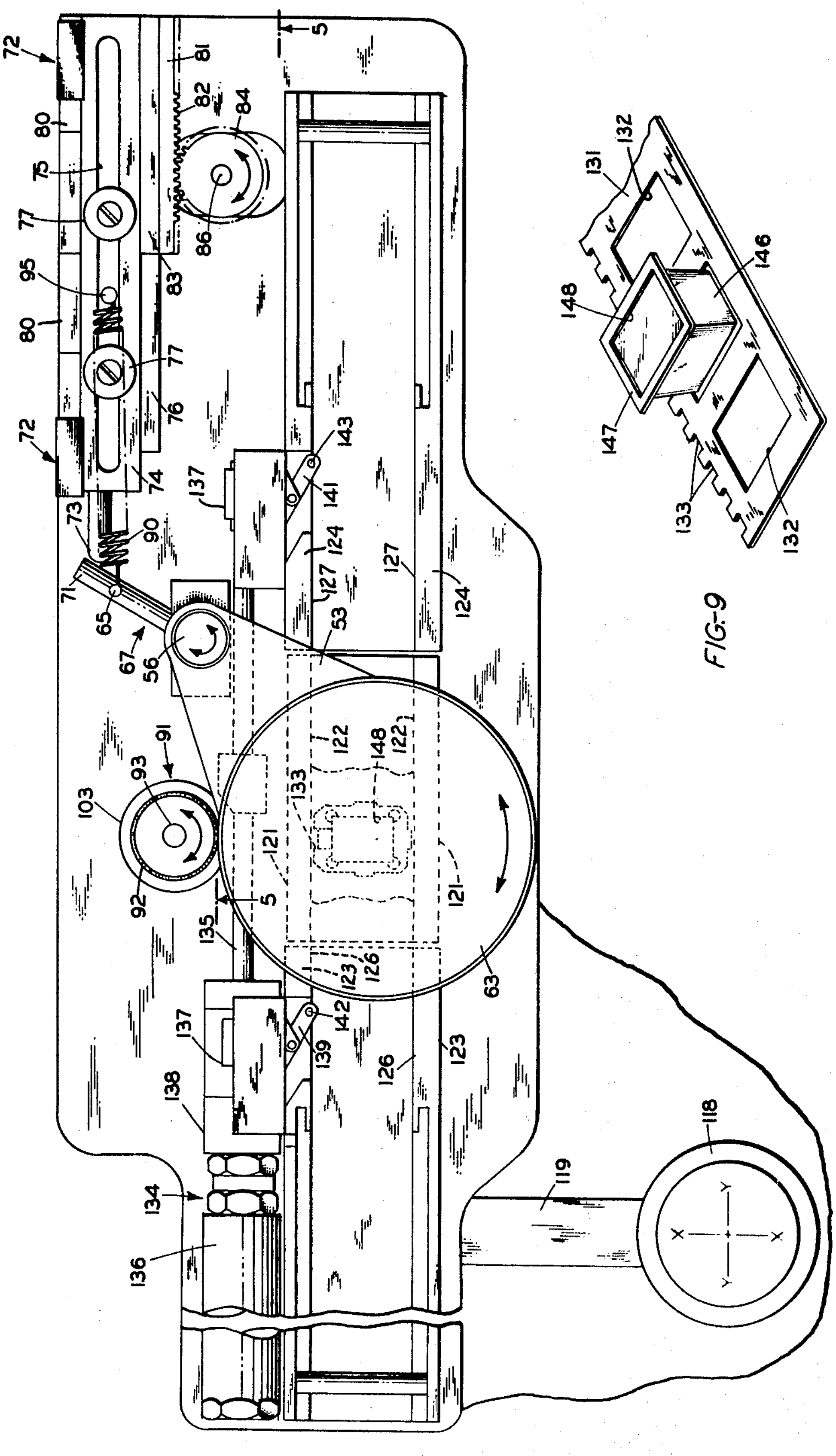
Figure 5:
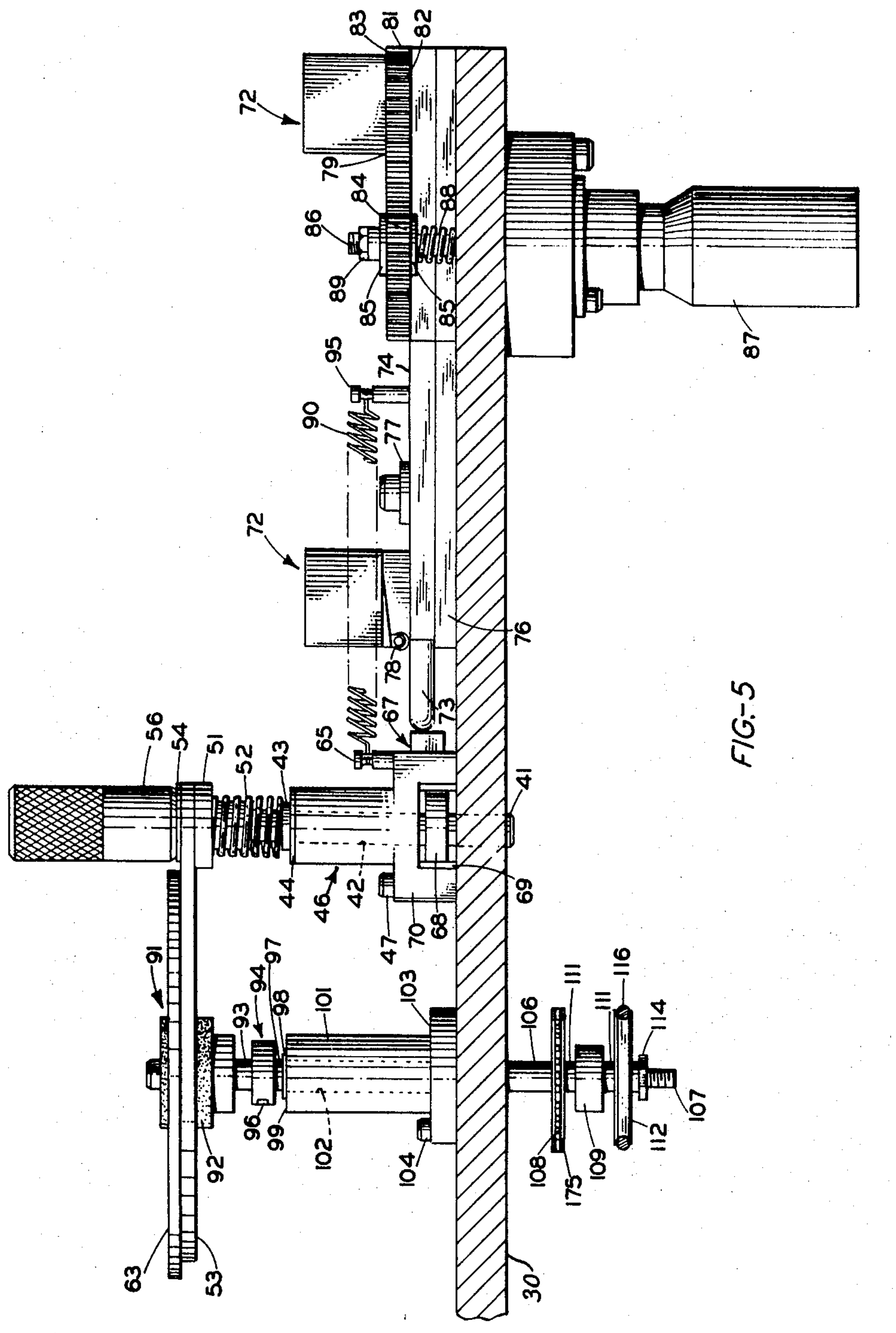
Figure 6:
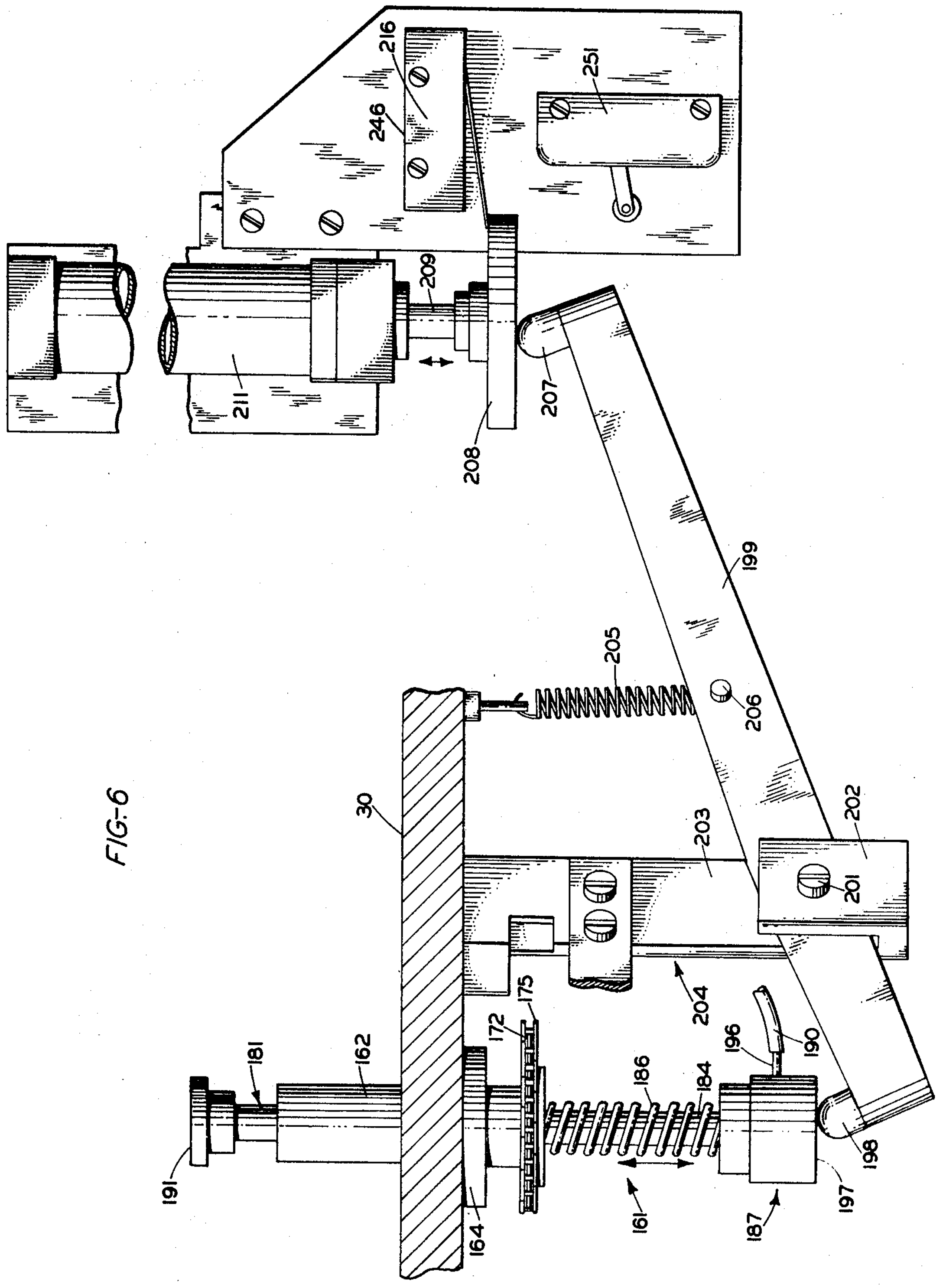
Figure 7:
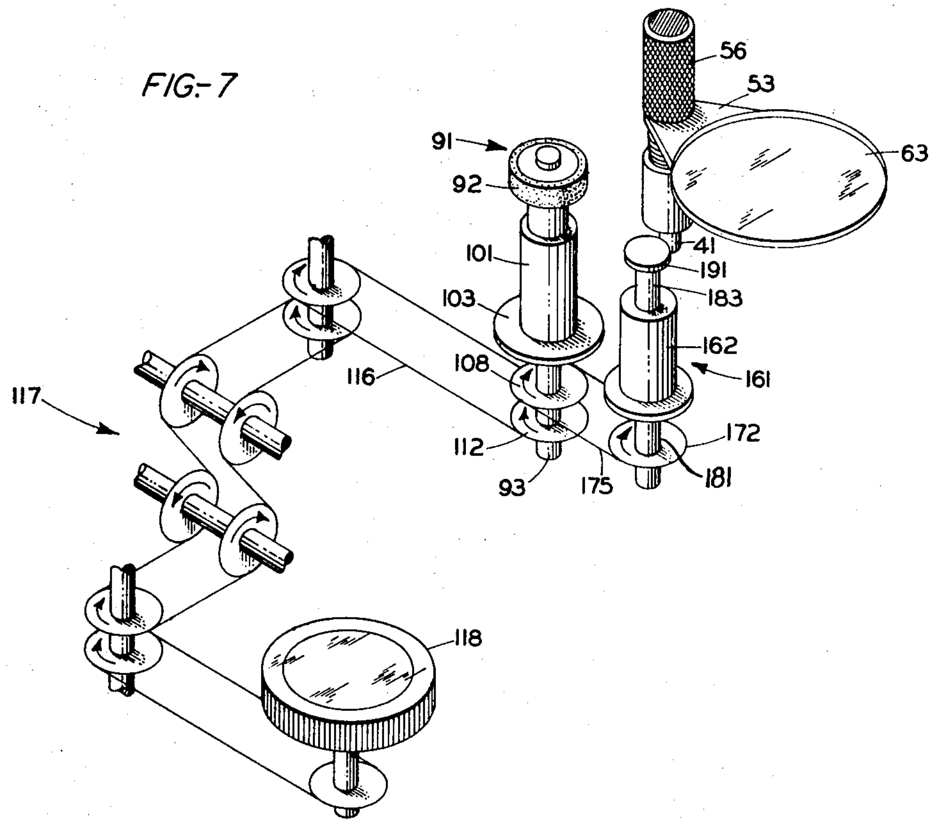
Figure 10:
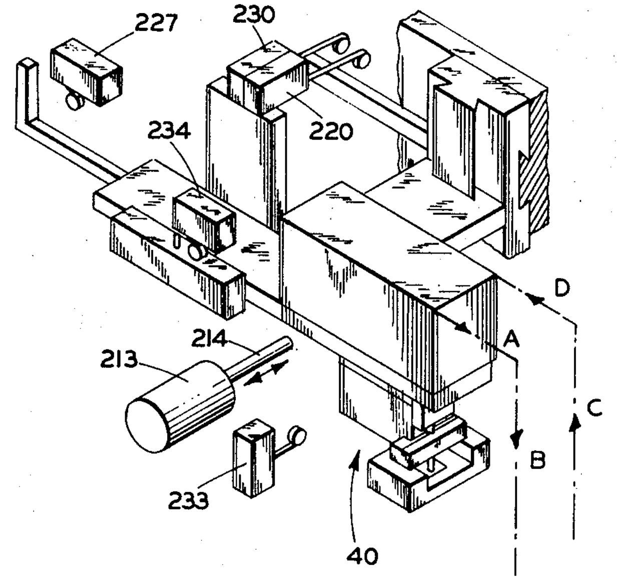
Figure 8:
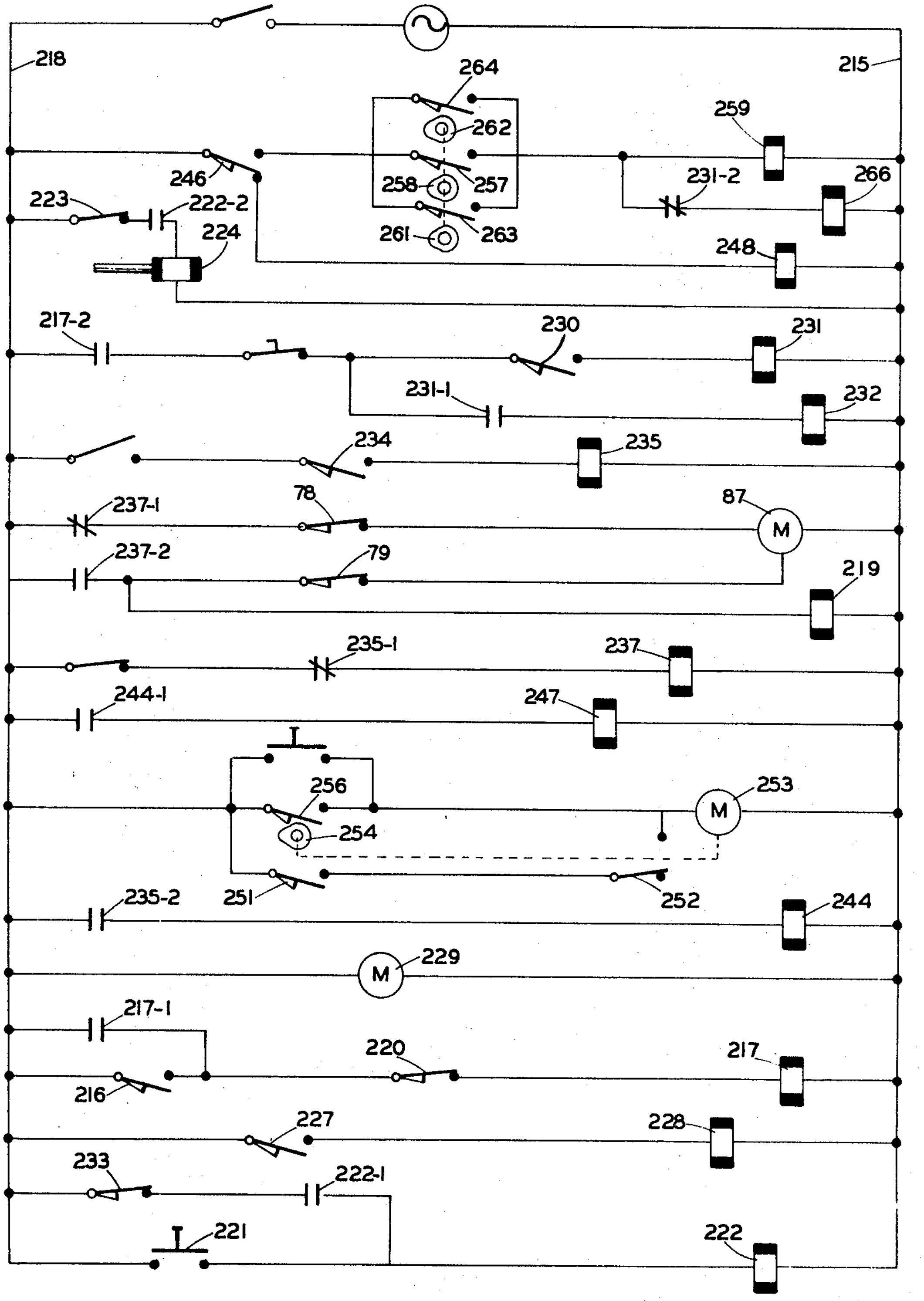

FIGS. 1–10 correspond to like figures appearing in the referenced application.

I claim:

1. In a method of assembling each one of a mass of first articles which are arranged in a plane with each one, respectively, of group of second articles, at a predetermined spatial position:

cyclically rotating and translating said mass of first articles to move a selected one of said first articles into said spatial position;

withdrawing said selected first article from said spatial position;

moving the remainder of said mass of first articles away from the immediate vicinity of said spatial position following each withdrawal of a selected article;

arranging said group of second articles in a column;

advancing the column to move each successive second article, one at a time, into alignment with said spatial position;

transferring each successive second article to said spatial position in a predetermined orientation;

returning each selected first article to said spatial position; and assembling each selected first article to each transferred second article, respectively.

2. In a method of assembling one article of a mass of articles to a substrate at a predetermined spatial position;

initially arranging said mass of articles in a first horizontal plane;

moving said mass of articles so that said mass of articles reside in a second horizontal plane which includes said position;

rotating and translating said mass of articles to move a selected one of said articles into said spatial position in a predetermined orientation;

holding said selected article;

withdrawing said held selected article from said spatial position;

moving the remainder of said mass of articles in said second horizontal plane out of the spatial position vicinity to a remote location;

conveying said substrate to a location which lies in a vertical plane through said spatial position;

transferring said substrate to said second horizontal plane;

moving said substrate to said spatial position in a predetermined orientation;

returning said selected article to said spatial position to abut against said substrate; and bonding said selected article to said substrate.

3. In an apparatus for aligning a first article with a second article at an assembly position;

a tray for holding a plurality of first articles;

means mounting said tray for pivotal movement in and out of said assembly position and for rotational movement in said assembly position;

a reference reticle for aligning articles in said assembly position;

means for maintaining said tray in said assembly position;

normally unoperated means for pivoting said tray out of said assembly position;

means for holding a selected first article off said tray in an aligned position;

means for operating said normally unoperated means to pivot said tray from said assembly position;

means for intermittently moving a plurality of successive, individually mounted second articles to position the leading one of said second articles in registration with said reticle;

means for lifting and then rotating said leading one of said second articles;

means supporting said mounting means and said lifting means for longitudinal and transverse movement;

means operable (a) when said tray is in said assembly position for moving said mounting means for said tray to substantially align said selected first article with said reticle, and (b) when said leading one of said second articles is in said assembly position for moving said lifting means to substantially align said leading second article with said reticle;

means frictionally engaged with said tray in said assembly position for rotating said tray to align a selected one of said first articles with said reticle; and means for rotating said lifting means to align said leading one of said second articles with said reticle.